US009704313B2

(12) United States Patent
Bhandari et al.

(10) Patent No.: US 9,704,313 B2
(45) Date of Patent: Jul. 11, 2017

(54) SYSTEMS AND METHODS FOR INTERACTING WITH ACCESS CONTROL DEVICES

(75) Inventors: Neelendra Bhandari, Barmer (IN); Chandrakantha C Reddy, Kumool (IN); John David Morrison, New South Wales (AU); Mushabbar Hussain, Bangalore (IN); Neil McDonnell, New South Wales (AU)

(73) Assignee: Honeywell International Inc., Morris Plains, NJ (US)

( * ) Notice: Subject to any disclaimer, the term of this patent is extended or adjusted under 35 U.S.C. 154(b) by 1476 days.

(21) Appl. No.: 13/062,307

(22) PCT Filed: Sep. 25, 2009

(86) PCT No.: PCT/US2009/058339

§ 371 (c)(1),
(2), (4) Date: Nov. 4, 2011

(87) PCT Pub. No.: WO2010/039598

PCT Pub. Date: Apr. 8, 2010

(65) Prior Publication Data

US 2012/0096131 A1 Apr. 19, 2012

(30) Foreign Application Priority Data

Sep. 30, 2008 (AU) ................................ 2008905087

(51) Int. Cl.
*G06F 15/177* (2006.01)
*G07C 9/00* (2006.01)

(52) U.S. Cl.
CPC ..... *G07C 9/00103* (2013.01); *G07C 9/00817* (2013.01); *G07C 2009/00865* (2013.01)

(58) Field of Classification Search
CPC ............ G07C 9/00039; G07C 9/00087; G07C 9/00103; G07C 9/00111; G07C 9/00309;
(Continued)

(56) References Cited

U.S. PATENT DOCUMENTS 3,753,232 A 8/1973 Sporer
3,806,911 A 4/1974 Pripusich
(Continued)

FOREIGN PATENT DOCUMENTS

CA 2240881 12/1999
CN 1265762 A 9/2000
(Continued)

OTHER PUBLICATIONS

"Keyfast Technical Overview", Corestreet Ltd., 21 pages, 2004.
(Continued)

*Primary Examiner* — Kevin Bates
*Assistant Examiner* — Ronak Patel
(74) *Attorney, Agent, or Firm* — Seager, Tufte & Wickhem, LLP

(57) ABSTRACT

Described herein are systems and methods for interacting with access control devices. In overview, a human user physically identifies an access control device with which he/she wishes to interact, for example in the context of providing commissioning and/or configuration data. The user then makes a physical local interaction with the device, for example by way of a smartcard having predefined characteristics. This causes the access control device to enable a wireless communications protocol, thereby to allow the user to discover the device using a portable device which implements a complementary wireless communications protocol. Commissioning information is then provided by way of the portable device to the access control device in a
(Continued)

wireless manner. Once this is complete, the access control device disables the wireless communications protocol.

19 Claims, 9 Drawing Sheets

(58) Field of Classification Search
CPC ...... G07C 9/00817; G07C 2009/00095; G07C 2009/00396; G07C 2009/00825; G07C 2009/00841; G07C 2209/08; G07C 9/00007; G07C 9/00031; G07C 9/00563; G07C 9/00571; G07C 9/00674; G07C 9/00904; H04L 2209/80; H04L 63/0428; H04L 63/061; H04L 63/105; H04L 63/20; G06Q 20/3278; G06Q 20/385; G07F 7/1016; H04W 88/08; H04W 12/08; H04W 84/18
USPC .......................................................... 709/220
See application file for complete search history.

(56) References Cited

U.S. PATENT DOCUMENTS 3,857,018 A 12/1974 Stark et al.
3,860,911 A 1/1975 Hinman et al.
3,866,173 A 2/1975 Moorman et al.
3,906,447 A 9/1975 Crafton
4,095,739 A 6/1978 Fox et al.
4,146,085 A 3/1979 Wills
4,148,012 A 4/1979 Baump et al.
4,161,778 A 7/1979 Getson, Jr. et al.
4,213,118 A 7/1980 Genest et al.
4,283,710 A 8/1981 Genest et al.
4,298,946 A 11/1981 Hartsell et al.
4,332,852 A 6/1982 Korklan et al.
4,336,902 A 6/1982 Neal
4,337,893 A 7/1982 Flanders et al.
4,353,064 A 10/1982 Stamm
4,373,664 A 2/1983 Barker et al.
4,379,483 A 4/1983 Farley
4,462,028 A 7/1984 Ryan et al.
4,525,777 A 6/1985 Webster et al.
4,538,056 A 8/1985 Young et al.
4,556,169 A 12/1985 Zervos
4,628,201 A 12/1986 Schmitt
4,646,964 A 3/1987 Parker et al.
4,685,615 A 8/1987 Hart
4,821,177 A 4/1989 Koegel et al.
4,847,839 A 7/1989 Hudson, Jr. et al.
5,070,468 A 12/1991 Niinomi et al.
5,071,065 A 12/1991 Aalto et al.
5,099,420 A 3/1992 Barlow et al.
5,172,565 A 12/1992 Wruck et al.
5,204,663 A 4/1993 Lee
5,227,122 A 7/1993 Scarola et al.
5,259,553 A 11/1993 Shyu
5,271,453 A 12/1993 Yoshida et al.
5,361,982 A 11/1994 Liebl et al.
5,404,934 A 4/1995 Carlson et al.
5,420,927 A 5/1995 Micali
5,449,112 A 9/1995 Heitman et al.
5,465,082 A 11/1995 Chaco
5,479,154 A 12/1995 Wolfram
5,481,481 A 1/1996 Frey et al.
5,526,871 A 6/1996 Musser et al.
5,541,585 A 7/1996 Duhame et al.
5,591,950 A 1/1997 Imedio-Ocana
5,604,804 A 2/1997 Micali
5,610,982 A 3/1997 Micali
5,631,825 A 5/1997 van Weele et al.
5,640,151 A 6/1997 Reis et al.
5,644,302 A 7/1997 Hana et al.
5,663,957 A 9/1997 Dent
5,666,416 A 9/1997 Micali
5,717,757 A 2/1998 Micali
5,717,758 A 2/1998 Micall
5,717,759 A 2/1998 Micali
5,732,691 A 3/1998 Maiello et al.
5,778,256 A 7/1998 Darbee
5,793,868 A 8/1998 Micali
5,914,875 A 6/1999 Monta et al.
5,915,473 A 6/1999 Ganesh et al.
5,927,398 A 7/1999 Maciulewicz
5,930,773 A 7/1999 Crooks et al.
5,960,083 A 9/1999 Micali
5,973,613 A 10/1999 Reis et al.
6,072,402 A 6/2000 Kniffin et al.
6,097,811 A 8/2000 Micali
6,104,963 A 8/2000 Cebasek et al.
6,119,125 A 9/2000 Gloudeman et al.
6,141,595 A 10/2000 Gloudeman et al.
6,149,065 A 11/2000 White et al.
6,154,681 A 11/2000 Drees et al.
6,167,316 A 12/2000 Gloudeman et al.
6,233,954 B1 5/2001 Mehaffey et al.
6,241,156 B1 6/2001 Kline et al.
6,249,755 B1 6/2001 Yemini et al.
6,260,765 B1 7/2001 Natale et al.
6,292,893 B1 9/2001 Micali
6,301,659 B1 10/2001 Micali
6,318,137 B1 11/2001 Chaum
6,324,854 B1 12/2001 Jayanth
6,334,121 B1 12/2001 Primeaux et al.
6,347,374 B1 2/2002 Drake et al.
6,366,558 B1 4/2002 Howes et al.
6,369,719 B1 4/2002 Tracy et al.
6,374,356 B1 4/2002 Daigneault et al.
6,393,848 B2 5/2002 Roh et al.
6,394,359 B1 5/2002 Morgan
6,424,068 B2 7/2002 Nakagishi
6,453,426 B1 9/2002 Gamache et al.
6,453,687 B2 9/2002 Sharood et al.
6,483,697 B1 11/2002 Jenks et al.
6,487,658 B1 11/2002 Micali
6,490,610 B1 12/2002 Rizvi et al.
6,496,575 B1 12/2002 Vasell et al.
6,516,357 B1 2/2003 Hamann et al.
6,518,953 B1 2/2003 Armstrong
6,546,419 B1 4/2003 Humpleman et al.
6,556,899 B1 4/2003 Harvey et al.
6,574,537 B2 6/2003 Kipersztok et al.
6,604,023 B1 8/2003 Brown et al.
6,615,594 B2 9/2003 Jayanth et al.
6,628,997 B1 9/2003 Fox et al.
6,647,317 B2 11/2003 Takai et al.
6,647,400 B1 11/2003 Moran
6,658,373 B2 12/2003 Rossi et al.
6,663,010 B2 12/2003 Chene et al.
6,665,669 B2 12/2003 Han et al.
6,667,690 B2 12/2003 Durej et al.
6,741,915 B2 5/2004 Poth
6,758,051 B2 7/2004 Jayanth et al.
6,766,450 B2 7/2004 Micali
6,789,739 B2 9/2004 Rosen
6,796,494 B1 9/2004 Gonzalo
6,801,849 B2 10/2004 Szukala et al.
6,801,907 B1 10/2004 Zagami
6,826,454 B2 11/2004 Sulfstede
6,851,621 B1 2/2005 Wacker et al.
6,871,193 B1 3/2005 Campbell et al.
6,886,742 B2 5/2005 Stoutenburg et al.
6,895,215 B2 5/2005 Uhlmann
6,910,135 B1 6/2005 Grainger
6,967,612 B1 11/2005 Gorman et al.
6,969,542 B2 11/2005 Klasen-Memmer et al.
6,970,070 B2 11/2005 Juels et al.
6,973,410 B2 12/2005 Seigel
6,983,889 B2 1/2006 Alles
6,989,742 B2 1/2006 Ueno et al.
7,004,401 B2 2/2006 Kallestad
7,019,614 B2 3/2006 Lavelle et al.
7,032,114 B1 4/2006 Moran
7,055,759 B2 6/2006 Wacker et al.

(56) References Cited

U.S. PATENT DOCUMENTS

| | | | |
|---|---|---|---|
| 7,124,943 | B2 | 10/2006 | Quan et al. |
| 7,130,719 | B2 | 10/2006 | Ehlers et al. |
| 7,183,894 | B2 | 2/2007 | Yui et al. |
| 7,203,962 | B1 | 4/2007 | Moran |
| 7,205,882 | B2 | 4/2007 | Libin |
| 7,216,007 | B2 | 5/2007 | Johnson |
| 7,216,015 | B2 | 5/2007 | Poth |
| 7,218,243 | B2 | 5/2007 | Hayes et al. |
| 7,222,800 | B2 | 5/2007 | Wruck |
| 7,233,243 | B2 | 6/2007 | Roche et al. |
| 7,243,001 | B2 | 7/2007 | Janert et al. |
| 7,245,223 | B2 | 7/2007 | Trela |
| 7,250,853 | B2 | 7/2007 | Flynn |
| 7,274,676 | B2 | 9/2007 | Cardei et al. |
| 7,313,819 | B2 | 12/2007 | Burnett et al. |
| 7,321,784 | B2 * | 1/2008 | Serceki et al. ................ 455/557 |
| 7,337,315 | B2 | 2/2008 | Micali |
| 7,343,265 | B2 | 3/2008 | Andarawis et al. |
| 7,353,396 | B2 | 4/2008 | Micali et al. |
| 7,362,210 | B2 | 4/2008 | Bazakos et al. |
| 7,362,227 | B2 * | 4/2008 | Kim .............................. 340/571 |
| 7,367,497 | B1 * | 5/2008 | Hill ............................ 235/382.5 |
| 7,376,839 | B2 | 5/2008 | Carta et al. |
| 7,379,997 | B2 | 5/2008 | Ehlers et al. |
| 7,380,125 | B2 | 5/2008 | Di Luoffo et al. |
| 7,383,158 | B2 | 6/2008 | Krocker et al. |
| 7,397,371 | B2 | 7/2008 | Martin et al. |
| 7,505,914 | B2 | 3/2009 | McCall |
| 7,542,867 | B2 | 6/2009 | Steger et al. |
| 7,574,734 | B2 | 8/2009 | Fedronic et al. |
| 7,586,398 | B2 | 9/2009 | Huang et al. |
| 7,600,679 | B2 | 10/2009 | Kshirsagar et al. |
| 7,661,603 | B2 | 2/2010 | Yoon et al. |
| 7,735,145 | B2 | 6/2010 | Kuehnel et al. |
| 7,796,536 | B2 | 9/2010 | Roy et al. |
| 7,818,026 | B2 | 10/2010 | Hartikainen et al. |
| 7,853,987 | B2 | 12/2010 | Balasubramanian et al. |
| 7,907,753 | B2 | 3/2011 | Wilson et al. |
| 7,937,669 | B2 | 5/2011 | Zhang et al. |
| 7,983,892 | B2 | 7/2011 | Anne et al. |
| 7,995,526 | B2 | 8/2011 | Liu et al. |
| 8,045,960 | B2 | 10/2011 | Orakkan |
| 8,095,889 | B2 | 1/2012 | DeBlaey et al. |
| 2002/0011923 | A1 | 1/2002 | Cunningham et al. |
| 2002/0022991 | A1 | 2/2002 | Sharood et al. |
| 2002/0046337 | A1 | 4/2002 | Micali |
| 2002/0118096 | A1 | 8/2002 | Hoyos et al. |
| 2002/0121961 | A1 | 9/2002 | Huff |
| 2002/0165824 | A1 | 11/2002 | Micali |
| 2003/0018889 | A1 * | 1/2003 | Burnett et al. ................ 713/153 |
| 2003/0033230 | A1 | 2/2003 | McCall |
| 2003/0174049 | A1 | 9/2003 | Beigel et al. |
| 2003/0208689 | A1 | 11/2003 | Garza |
| 2003/0233432 | A1 | 12/2003 | Davis et al. |
| 2004/0003050 | A1 * | 1/2004 | Lewis ........................... 709/208 |
| 2004/0049675 | A1 * | 3/2004 | Micali et al. ................. 713/158 |
| 2004/0062421 | A1 | 4/2004 | Jakubowski et al. |
| 2004/0064453 | A1 | 4/2004 | Ruiz et al. |
| 2004/0087362 | A1 | 5/2004 | Beavers |
| 2004/0174247 | A1 * | 9/2004 | Rodenbeck et al. ......... 340/5.64 |
| 2004/0205350 | A1 | 10/2004 | Waterhouse et al. |
| 2005/0138380 | A1 | 6/2005 | Fedronic et al. |
| 2006/0059557 | A1 | 3/2006 | Markham et al. |
| 2007/0109098 | A1 | 5/2007 | Siemon et al. |
| 2007/0132550 | A1 | 6/2007 | Avraham et al. |
| 2007/0171862 | A1 | 7/2007 | Tang et al. |
| 2007/0268145 | A1 | 11/2007 | Bazakos et al. |
| 2007/0272744 | A1 | 11/2007 | Bantwal et al. |
| 2008/0086758 | A1 * | 4/2008 | Chowdhury et al. ............. 726/2 |
| 2008/0106369 | A1 | 5/2008 | Conforti |
| 2008/0173709 | A1 | 7/2008 | Ghosh |
| 2008/0272881 | A1 | 11/2008 | Goel |
| 2009/0018900 | A1 | 1/2009 | Waldron et al. |
| 2009/0080443 | A1 | 3/2009 | Dziadosz |
| 2009/0086692 | A1 | 4/2009 | Chen |
| 2009/0121830 | A1 | 5/2009 | Dziadosz |
| 2009/0143104 | A1 * | 6/2009 | Loh et al. ..................... 455/558 |
| 2009/0167485 | A1 | 7/2009 | Birchbauer et al. |
| 2009/0168695 | A1 | 7/2009 | Johar et al. |
| 2009/0258643 | A1 | 10/2009 | McGuffin |
| 2009/0266885 | A1 | 10/2009 | Marcinowski et al. |
| 2009/0292524 | A1 | 11/2009 | Anne et al. |
| 2009/0292995 | A1 | 11/2009 | Anne et al. |
| 2009/0292996 | A1 | 11/2009 | Anne et al. |
| 2009/0328152 | A1 | 12/2009 | Thomas et al. |
| 2009/0328203 | A1 | 12/2009 | Haas |
| 2010/0036511 | A1 | 2/2010 | Dongare |
| 2010/0148918 | A1 | 6/2010 | Gerner et al. |
| 2010/0164720 | A1 | 7/2010 | Kore |
| 2010/0269173 | A1 | 10/2010 | Srinivasa et al. |
| 2011/0038278 | A1 | 2/2011 | Bhandari et al. |
| 2011/0071929 | A1 | 3/2011 | Morrison |
| 2011/0115602 | A1 | 5/2011 | Bhandari et al. |
| 2011/0133884 | A1 | 6/2011 | Kumar et al. |
| 2011/0153791 | A1 | 6/2011 | Jones et al. |
| 2011/0167488 | A1 | 7/2011 | Roy et al. |
| 2011/0181414 | A1 | 7/2011 | G et al. |
| 2012/0106915 | A1 | 5/2012 | Palmer |
| 2012/0121229 | A1 | 5/2012 | Lee |
| 2012/0133482 | A1 | 5/2012 | Bhandari et al. |

FOREIGN PATENT DOCUMENTS

| | | | |
|---|---|---|---|
| DE | 19945861 | | 3/2001 |
| EP | 0043270 | | 1/1982 |
| EP | 0122244 | | 10/1984 |
| EP | 0152678 | | 8/1985 |
| EP | 0629940 | | 12/1994 |
| EP | 0858702 | | 4/2002 |
| EP | 1339028 | | 8/2003 |
| EP | 1630639 | | 3/2006 |
| GB | 2251266 | | 7/1992 |
| GB | 2390705 | | 1/2004 |
| JP | 6019911 | | 1/1994 |
| JP | 2003/074942 | | 3/2003 |
| JP | 2003/240318 | | 8/2003 |
| WO | WO 84/02786 | | 7/1984 |
| WO | WO 94/19912 | | 9/1994 |
| WO | WO 96/27858 | | 9/1996 |
| WO | WO 00/11592 | | 3/2000 |
| WO | 0076220 | A1 | 12/2000 |
| WO | WO 01/42598 | | 6/2001 |
| WO | WO 01/57489 | | 8/2001 |
| WO | WO 01/60024 | | 8/2001 |
| WO | WO 02/32045 | | 4/2002 |
| WO | WO 02/091311 | | 11/2002 |
| WO | WO 03/090000 | | 10/2003 |
| WO | WO 2004/092514 | | 10/2004 |
| WO | WO 2005/038727 | | 4/2005 |
| WO | WO 2006/021047 | | 3/2006 |
| WO | 2006126974 | A1 | 11/2006 |
| WO | 2007043798 | A1 | 4/2007 |
| WO | WO 2008/045918 | | 4/2008 |
| WO | WO 2008/144803 | | 12/2008 |
| WO | 2010039598 | A2 | 4/2010 |
| WO | WO 2010/106474 | | 9/2010 |

OTHER PUBLICATIONS

U.S. Appl. No. 13/533,334, filed Jun. 26, 2012.

"Certificate Validation Choices," CoreStreet, Inc., 8 pages, 2002.

"CoreStreet Cuts the PKI Gordian Knot," Digital ID World, pp. 22-25, Jun./Jul. 2004.

"Distributed Certificate Validation," CoreStreet, Ltd., 17 pages, 2006.

"Identity Services Infrastructure," CoreStreet Solutions—Whitepaper, 12 pages, 2006.

"Important FIPS 201 Deployment Considerations," Corestreet Ltd.—Whitepaper, 11 pages, 2005.

"Introduction to Validation for Federated PKI," Corestreet Ltd, 20 pages, 2006.

"Manageable Secure Physical Access," Corestreet Ltd, 3 pages, 2002.

(56) References Cited

OTHER PUBLICATIONS

"MiniCRL, Corestreet Technology Datasheet," CoreStreet, 1 page, 2006.
"Nonce Sense, Freshness and Security in OCSP Responses," Corestreet Ltd, 2 pages, 2003.
"Real Time Credential Validation, Secure, Efficient Permissions Management," Corestreet Ltd, 5 pages, 2002.
"The Role of Practical Validation for Homeland Security," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
U.S. Appl. No. 13/292,992, filed Nov. 9, 2011.
Goldman et al., "Information Modeling for Intrusion Report Aggregation," IEEE, Proceedings DARPA Information Survivability Conference and Exposition II, pp. 329-342, 2001.
Honeywell, "Excel Building Supervisor—Integrated R7044 and FS90 Ver. 2.0," Operator Manual, 70 pages, Apr. 1995.
http://www.tcsbasys.com/products/superstats.asp, TCS/Basys Controls: Where Buildings Connect With Business, 2 pages, printed August 26, 2003.
http://www.tcsbasys.com/products/sz1009.asp, TCS/Basys Controls: Where Buildings Connect With Business, 1 page, printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.
http://www.tcsbasys.com/products/sz1020series.asp, TCS/Basys Controls: Where Buildings Connect With Business, 2 pages, printed Aug. 26, 2003.
http://www.tcsbasys.com/products/sz1022.asp, TCS/Basys Controls: Where Buildings Connect With Business, 2 pages, printed Aug. 26, 2003.
http://www.tcsbasys.com/products/sz1024.asp, TCS/Basys Controls: Where Buildings Connect With Business, 2 pages, printed Aug. 26, 2003.
http://www.tcsbasys.com/products/sz1030series.asp, TCS/Basys Controls: Where Buildings Connect With Business, 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
http://wwww.tcsbasys.com/products/sz1031.asp, TCS/Basys Controls: Where Buildings Connect With Business, 2 pages, printed Aug. 26, 2003.
Trane, "System Programming, Tracer Summit Version 14, BMTW-SVP01D-EN," 623 pages, 2002.
Search Report for Corresponding Application No. EP09818305 dated Jun. 11, 2014.

* cited by examiner

SYSTEMS AND METHODS FOR INTERACTING WITH ACCESS CONTROL DEVICES

FIELD OF THE INVENTION

The present invention relates to access control, and more particularly to systems and methods for interacting with access control devices. In particular, some embodiments include access control devices themselves, and/or software operable on access control devices or other devices.

Embodiments of the invention have been particularly developed for commissioning and/or configuring access control devices by way of portable wireless devices, such as PDAs, and the present disclosure is primarily focused accordingly. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

It is known to use a large number of access control devices in an access control environment. Before each individual access control device is able to function as part of the access control environment, those individual devices need to be commissioned and configured.

There are two main approaches for commissioning access control devices. The first approach relies on the access control devices being connected to a common network. An auto-discovery process is conducted over this network to discover the individual devices, assign unique identifiers, and transmit other commissioning information. This approach is often difficult to implement, particularly where network security constraints affect the ability to conduct an auto-discovery process (which typically necessitates broadcast messaging). There are additional complications where there is no DHCP server available, and practical difficulties in matching electronically discovered devices to physically observable devices. For example, it is generally impossible for a user to selectively assign consecutive site-specific unique identifiers to devices located in physical proximity, on the basis that physical device locations are not revealed via network discovery.

The second approach is to individually directly connect each access control device to a terminal, such as a laptop computer, and manually transmit the commissioning information from the terminal to the device. It will be appreciated that this is a time-consuming process, and impractical where there are a large number of access control devices, or where hardware for slowing a direct connection is either unavailable or inconvenient to use. Additionally, the process is error prone, and there is a risk that non-unique identifiers could be assigned.

It follows that there is a need in the art for improved systems and methods for interacting with access control devices.

SUMMARY

It is an object of the present invention to overcome or ameliorate at least one of the disadvantages of the prior art, or to provide a useful alternative.

One embodiment provides a method for operating an access control device, the method including the steps of:

(a) receiving data indicative of a physical local interaction with the device;

(b) responsive to the data received at (a), selectively enabling a wireless communications protocol;

(c) accepting commissioning and/or configuration information via the wireless communications protocol; and (d) disabling the wireless communications protocol.

One embodiment provides an access control device including:

an interface for allowing a physical local interaction with the device;

a processor that is responsive to the physical local interaction with the device for selectively enabling a wireless communications protocol;

a wireless communication module for accepting commissioning and/or configuration information via the wireless communications protocol; and a processor responsive to predefined conditions for disabling the wireless communications protocol.

One embodiment provides a method for interacting with an access control device, the method including the steps of:

making a physical local interaction with the access control device, wherein the access control device enables a wireless communications protocol responsive to the physical local interaction;

discovering the access control device by way of a wireless device which implements a complementary wireless communications protocol;

wirelessly communicating commissioning and/or configuration information from the wireless device to the access control device; and allowing the access control device to disable the wireless communications protocol.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for interacting with access control devices. In overview, a human user physically identifies an access control device with which he/she wishes to interact, for example in the context of providing commissioning and/or configuration data. The user then makes a physical local interaction with the device, for example by way of a smartcard having predefined characteristics. This causes the access control device to enable a wireless communications protocol, thereby to allow the user to discover the device using a portable device which implements a complementary wireless communications protocol. Commissioning information is then wirelessly provided by way of the portable device to the access control. Once this is complete, the access control device disables the wireless communications protocol.

Figure 1:
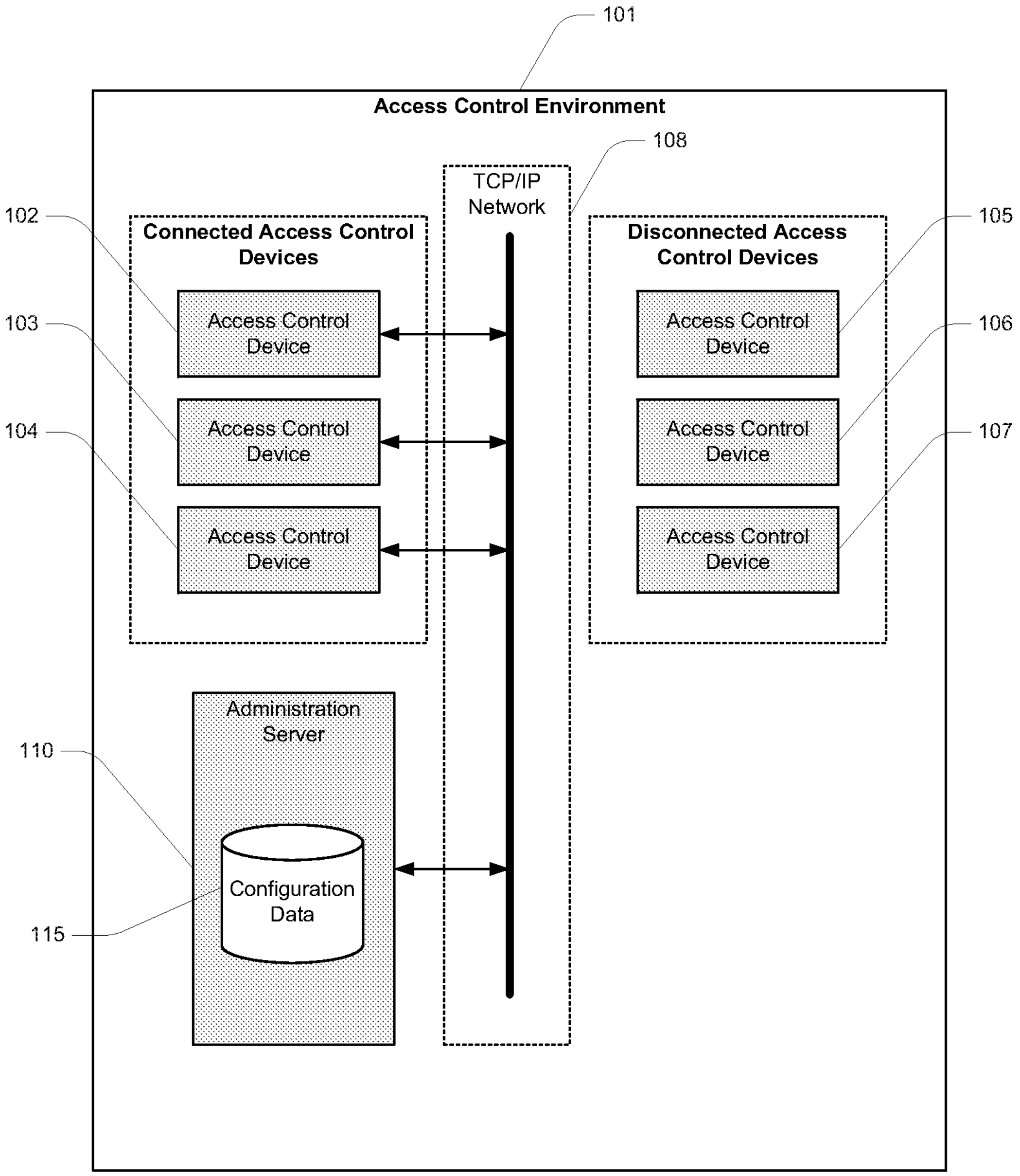
FIG. 1 schematically illustrates an access control environment according to one embodiment.

FIG. 1 schematically illustrates an access control environment 101 according to one embodiment. Environment 101 includes connected access control devices 102 to 104 and disconnected access control devices 105 to 107. The primary point of difference between the connected access control devices and the disconnected access control devices is that the former are connected to a network 108, whilst the latter are not. All of the access control devices have been commissioned for operation within environment 101. This includes a process whereby individual devices are provided with commissioning data.

The term "commissioning data" refers to data used for the commissioning of an access control device. Commissioning data is applicable (able to be applied) to an access control device to commission that device (progress the device from an uncommissioned state to a commissioned state). "Commissioning" is a process whereby an access control device is provided with and applies one or more aspects of data such that the device is able to function in the context of a wider access control environment including a plurality of distributed (and optionally networked) access control devices. The aspects of data include one or more of:

- A site-specific UID. This allows identification of a given device in the context of an access control environment.
- Network information, such as an IP address, a subnet mask, default gateway and/or encryption keys.
- Security information, for example information that allows secure communications between the device and other components on the network.
- Other commissioning information. Examples include default configuration data for the device, substantially any information that is to be constant or vary predictably across all devices in a given environment (such as organization details), or any unique parameters that are assignable based on a rule.

An administration server 110 is also connected to network 108 (such as a TCP/IP or other network), and the connected access control devices are able to communicate with this administration server over the network. Administration server 110 includes a database 115 for maintaining configuration data.

In the present embodiment, database 115 includes, for each access control device, up-to-date configuration data. This configuration data is "up-to-date" in the sense that it defines that data a particular device should ideally be applying. However, it will be appreciated that the configuration data applied at a given time by a particular disconnected access control device might not be up-to-date, and therefore should ideally be updated for compliance with database 115. For each access control device, the configuration data is made up of one or more aspects of configuration data. Notionally, the total configuration data for an access control device is able to be broken down into individual aspects. For example, in some embodiments the aspects include, but are not limited to, the following:

- Access configuration data. For example, in some embodiments this aspect of configuration data includes data indicative of access permissions for various users/cards, and so on.
- Hardware configuration data, such as firmware and/or other hardware drivers.
- Scheduling data. In some embodiments an access control device is scheduled such that it behaves differently at different times. For example, in one scenario the level of access permission required on a weekday is different to that required on a weekend or public holiday. In some cases, access control devices are scheduled on a seven-day cycle, and scheduling data concerning public holidays or other unusual days needs to be provided on a periodic basis.

Although server 110 is schematically illustrated as a single component, in some cases it is defined by a plurality of distributed networked components.

For the sake of the present disclosure, it is assumed that each of access control devices 102 to 107 include similar hardware and software components, and each that device is configured to progress between a connected state and a disconnected state depending on whether or not a connection to network 108 and central server is available. However, in other embodiments a variety of different access control devices are used. For example, in some embodiments the access control devices are designed, from a hardware perspective, to allow/deny control to a variety of different locations or functionalities.

In the context of the present disclosure, the term "access control device" refers generally to any device having an access control functionality. That is, any device with which a user interacts to gain access to a physical region or virtual functionality. Common examples include devices that control locking mechanisms on doors or other barriers. An access control device includes either or both of hardware and software components.

Figure 2:
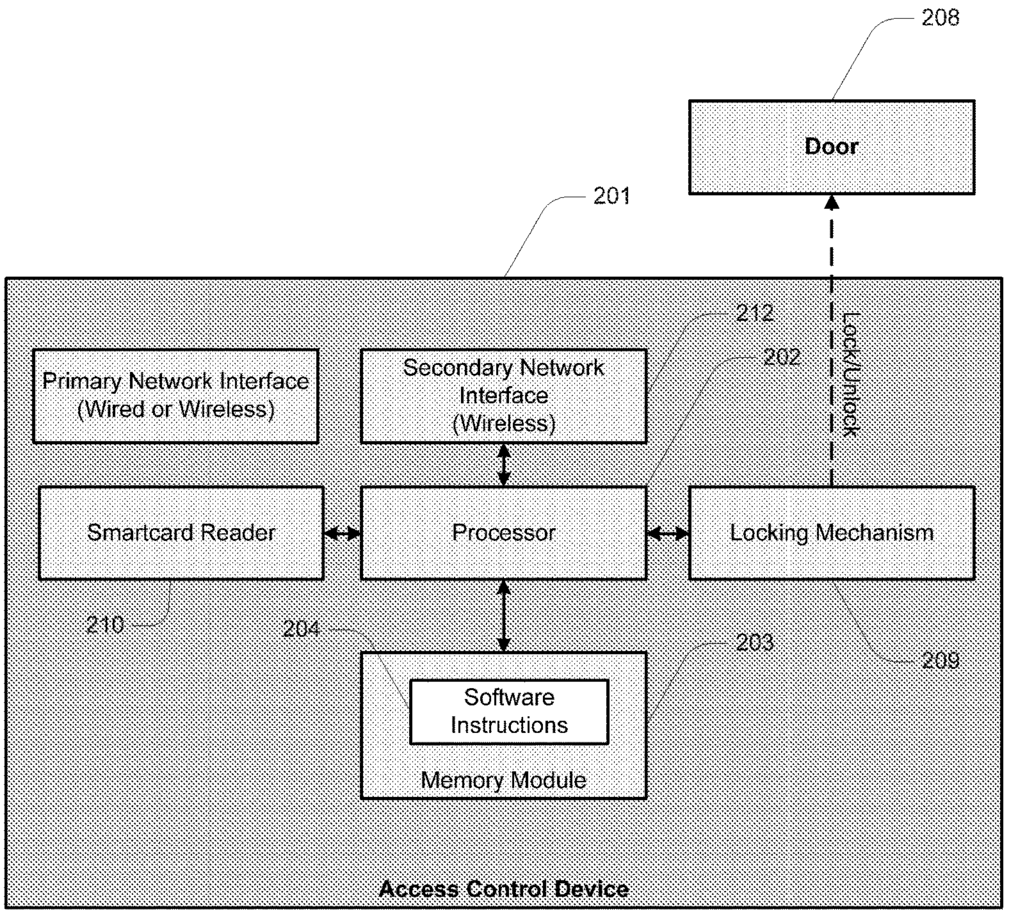
FIG. 2 schematically illustrates an access control device according to one embodiment.

FIG. 2 illustrates an exemplary access control device 201 according to one embodiment. Device 201 is configured for integration into an access control environment such as environment 101 of FIG. 1.

Device 201 includes a processor 202 coupled to a memory module 203. Memory module 203 carries software instructions 204 which, when executed on processor 202, allow device 201 to perform various methods and functionalities described herein, which in themselves also provide embodiments of the present invention.

In the present example, device 201 is configured for selectively granting access through a door 208. In particular, processor 201 is coupled to a locking mechanism 209 which, when in a locked state, prevents access through door 208, and when in an unlocked state, permits access through door 208. The locked state is default. A user wishing to gain access through door 208 presents an access card to a card reader 210, which is also coupled to processor 201. Upon presentation of an access card, processor 201 performs an authentication process to determine whether or not access should be granted. In the event that the authentication process is successful, mechanism 209 is progressed to the unlocked state for a predefined period of time, typically the order of a few seconds, before returning to the locked state. If the authentication process is unsuccessful, mechanism 209 remains in the locked state, and access is denied.

The nature of card reader present varies between embodiments depending on the nature of access card that is used in a given access control environment. In the embodiment of FIG. 2, access cards are in the form of smartcards, and reader 210 is a smartcard reader. However, in other embodiments alternate components are provided for the same purpose, including the likes of magnetic card readers, proximity readers, biometric readers, keypads, and so on.

In the present embodiment, device includes two network interfaces: a primary network interface 212A and a secondary network interface 212B. However, in some embodiments only the secondary network interface is provided. Primary network interface 212A is configured for allowing device 201 to communicate over a wider network, such as network 108 of FIG. 1. This may be a wired or wireless network. In the present embodiment device 201 is configured for operation in either a connected state (with connection to such a network) or a disconnected state (without connection to such a network).

Secondary network interface 212B is a wireless network interface, and allows device 201 to implement a wireless communications protocol, presently being an 802.11 type network interface. However, the likes of Bluetooth, IRDA and so on are used in other embodiments. In broad terms, network interface 212B is activated in an ad-hoc mode to allow discovery of device 201 by a wireless device which implements a complementary wireless communications protocol. As discussed in more detail further below, this provides a basis for the provision of commissioning and/or configuration data to device 201 in accordance with embodiments of the present invention.

Figure 3:
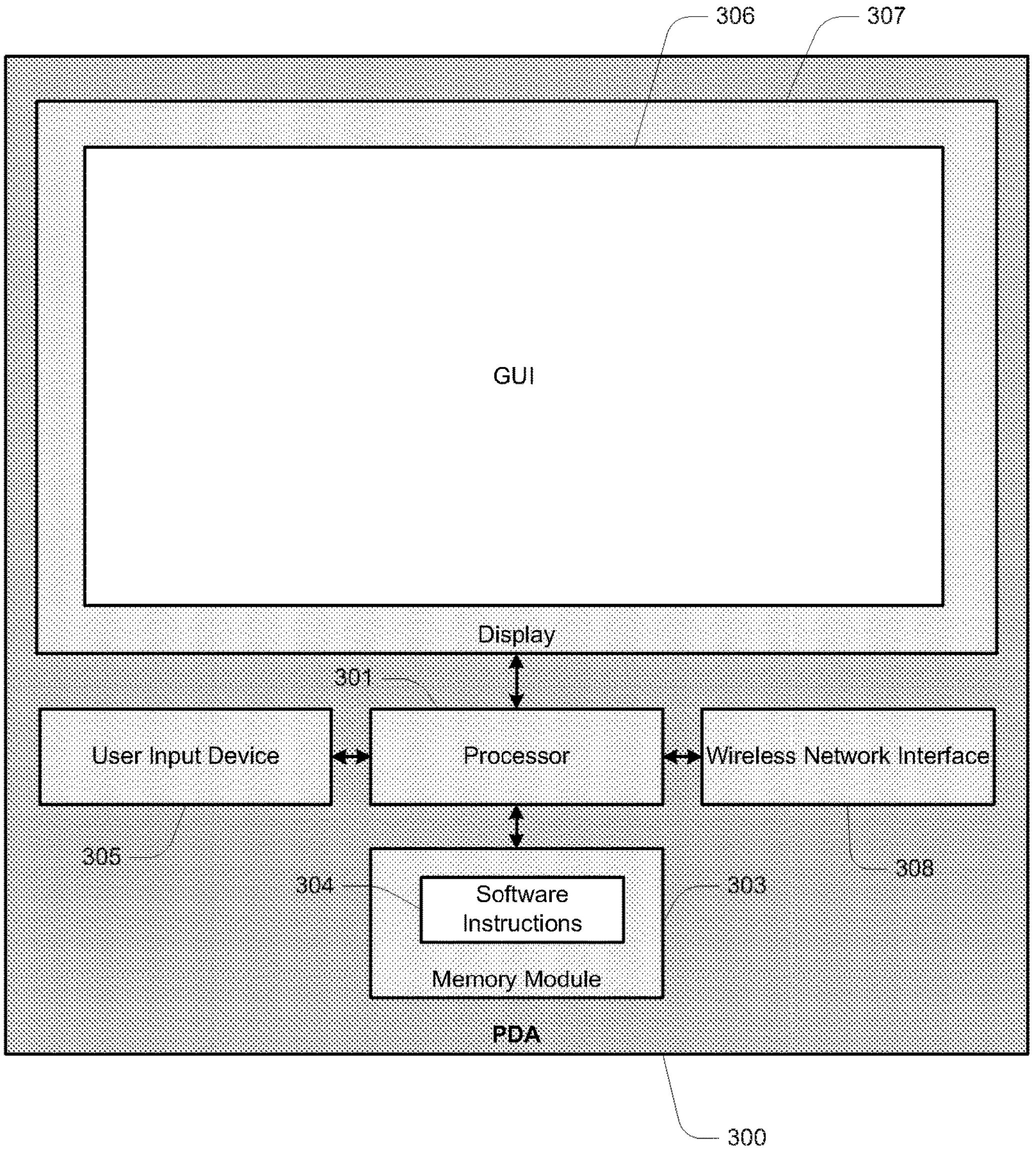
FIG. 3 schematically illustrates a PDA according to one embodiment.

FIG. 3 illustrates a wireless device, more specifically being a portable wireless device, in the form of a personal digital assistant (PDA) 300. The example of a PDA is used throughout the present specification, however, it should be appreciated that other wireless devices are used in alternate embodiments. Examples include laptop computers, portable phones, portable gaming devices, and so on. It will be appreciated that a wide range of portable devices include corresponding functional components as compared with PDA 300.

PDA 300 includes a processor 301, which is coupled to a memory module 302 for executing software instructions 303 which are stored on memory module 302. These software instructions allow PDA 300 to perform methods according to various embodiments of the present invention, described in more detail further below. A human user interacts with PDA 300 (and functionalities provided via software instructions 303) by way of an input device 305 (which may include one or more buttons, and/or a touch-screen, and the like) and a GUI 306 which is displayed on a display screen 307.

PDA 300 also includes a wireless network interface to implement a wireless communications protocol, presently being an 802.11 type network interface. However, the likes of Bluetooth, IRDA and so on are used in other embodiments. In broad terms, this allows PDA 300 to communicate with device 201, provided network device 212B is configured for operation in an ad-hoc mode thereby to allow such communication.

Figure 4A:
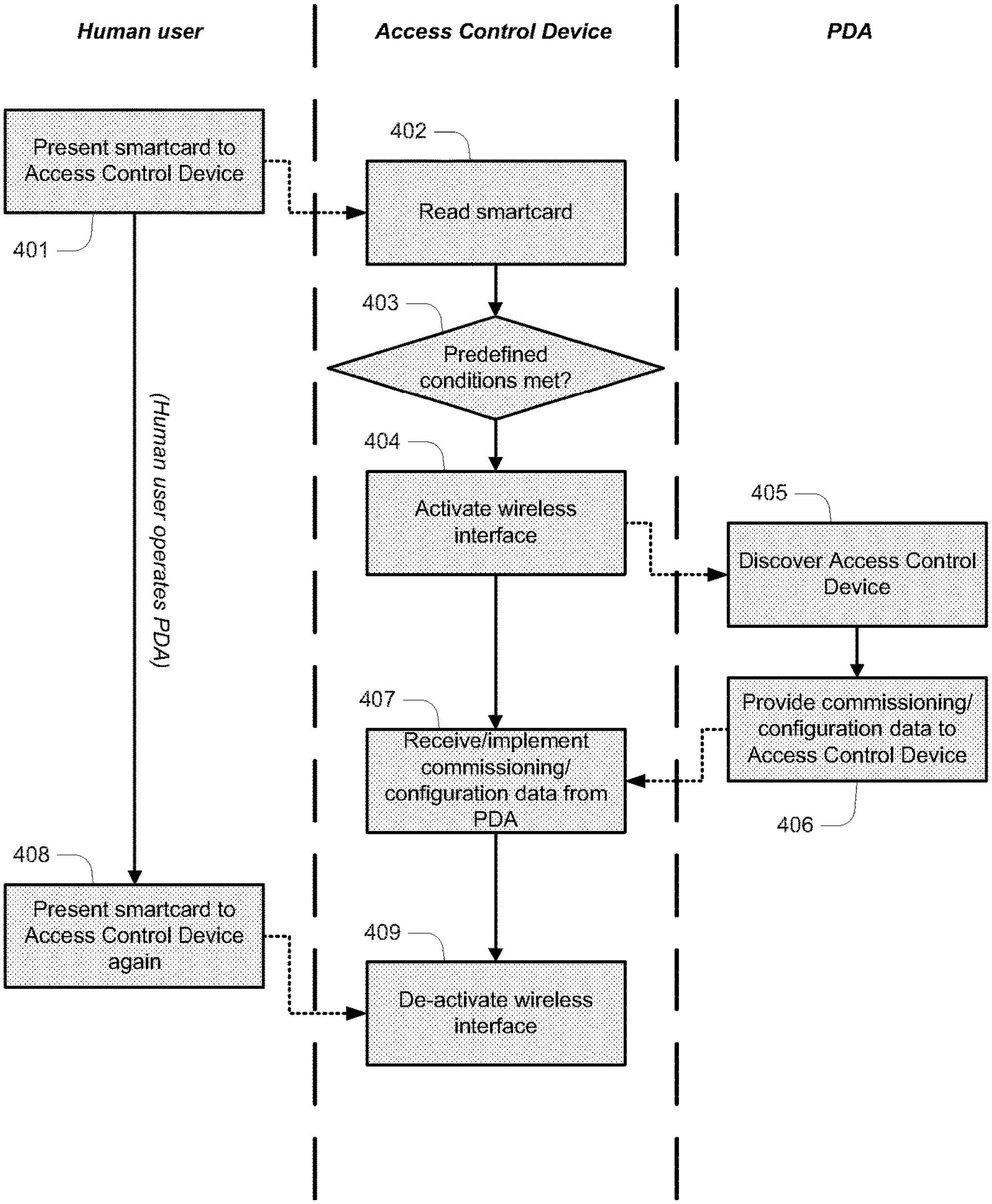
FIG. 4A schematically illustrates a method according to one embodiment.

FIG. 4A illustrates methods according to embodiments of the present invention, including methods respectively performed by a human user, access control device (such as device 201) and a PDA (such as PDA 300). Dashed lines are used to indicate where a step from one method influences a step in another method.

Initially, a human user physically identifies an access control device with which he/she wishes to interact. The user then partakes in a local physical interaction with the device. More specially, at step 401 the user presents a "special" smartcard to an access control device. This smartcard is "special" in the sense that it is configured to cause the access control device to activate a wireless communications protocol (as discussed below), as opposed to being a "normal" smartcard which is presented thereby to seek permission to a guarded functionality (for example to unlock a door).

In other embodiments the user partakes in an alternate local physical interaction, including but not limited to the presentation of a proximity card, biometric data, passcode, or the like. The underlying intention is that the user physically provides some form of data to the access control device.

In some embodiments the "special" smartcard is a blank smartcard—such an approach is particularly suitable for the purposes of initial commissioning. However, in other embodiments the "special" smartcard maintains data which allows it to meet predefined criteria known by the access control device.

For security reasons, it will be appreciated that a blank smartcard can not be used as a "special" smartcard for an access control device that has previously been commissioned. A "special" smartcard for such purposes may carry credential information that is authenticated by the access control device in a modified access operation, thereby to control activation of the wireless communications protocol. In some cases similar enhanced security can be applied at a factory-level so that it applied pre-commissioning.

Step 402 includes reading a smartcard at the access control device. This is followed by a decision 403, where it is considered whether predefined conditions are met. That is, the access control device compares data defined on the basis of reading the smartcard with stored data, thereby to determine whether the presented smartcard is a "special" smartcard. In the event that the predefined conditions are met, the method progresses to step 404, where the access control device activates a wireless communications protocol in an ad-hoc mode. This allows the access control to be discovered, and for an ad-hoc communications session between the access control device and another device which implements a complementary wireless communications protocol.

The concept of "activating a wireless communications protocol" should be read broadly. For instance, in some embodiments hardware components that provide wireless functionality are already operation, and the step of "activation" includes the modification of operational characteristics (for example modification of visibility/discovery settings, security settings, radio settings, or the like). From a functional perspective, the "activation" allows for step 405, at which the access control device is discovered by the PDA. This allows the PDA to interact with the access control device.

After the PDA detects the presence of a new wireless device (being the access control device), a software-based commissioning application executing on the PDA is configured to automatically discover & displays the access control device via a GUI. This is achieved subject to an exchange of secure messages between the PDA and access control device.

Step 406 includes wirelessly providing, by way of the PDA, commissioning and/or configuration information to the access control device. This data is received at step 407. The manner by which this is achieved varies between embodiments. In one embodiment the access control device maintains data indicative of a plurality of web pages, and these web-pages are rendered in a software application (such as a web-browser or specialized application) executing on the PDA. It will be appreciated that a similar approach is commonly used for configuring other networked devices which lack user inputs, such as routers and the like.

In some embodiments the web pages allow the user to assign the likes of a unique user-friendly name to the device (for example a name descriptive of the device location, such a "server room door lock"), along with other identification information. If the access control device is connected to a LAN and no DHCP server is available, the user can additionally assign IP address related parameters to the access control device. The user can also, in some embodiments, assign basic configuration data by way of web-pages provided by the access control device, such as door connections, and test the door connections. These tests can include door test, LCD test, biometric module test & diagnostics, depending on the nature of the access control device. Furthermore, in some cases the PDA carries firmware data for access control devices, and this is used to update firmware in an access control device at steps 406 and 407.

The commissioning application on the PDA is configured to store details of the access control device (including existing details and details set by the user during the interaction), along with physical access control device identification like its MAC address, serial number, and so on. In some embodiments this includes an upload of configured door connections, which is in some cases propagated back to a central server by way of the PDA.

There are significant advantages associated with the present discovery arrangement. In particular, a user is able to wirelessly interact with an access control device. Furthermore, the user is able to know which wireless device he/she is wirelessly interacting.

In the present embodiment, once the user has finished interacting with the access control device, he/she presents the "special" smartcard to the access control device once again at step 408. Responsive to this, the access control device deactivates the wireless communications protocol (at least to the extent that it is "activated" at step 404). The PDA is therefore dissociated from the access control device, and the commissioning application on the PDA marks the access control device as offline and removes it from the display. The user is then able to repeat the process with another access control device.

Figure 4B:
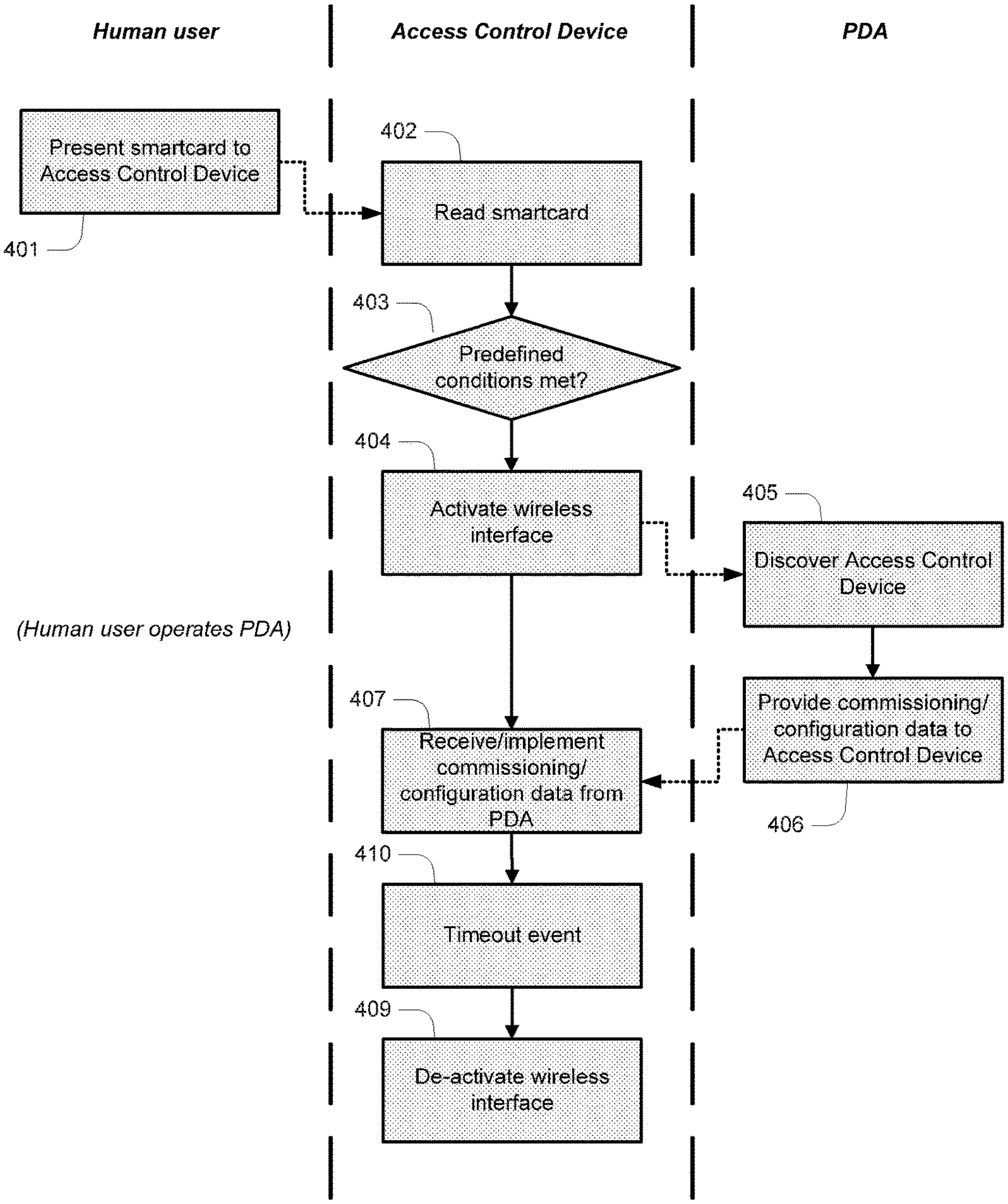
FIG. 4B schematically illustrates a method according to one embodiment.
Figure 4C:
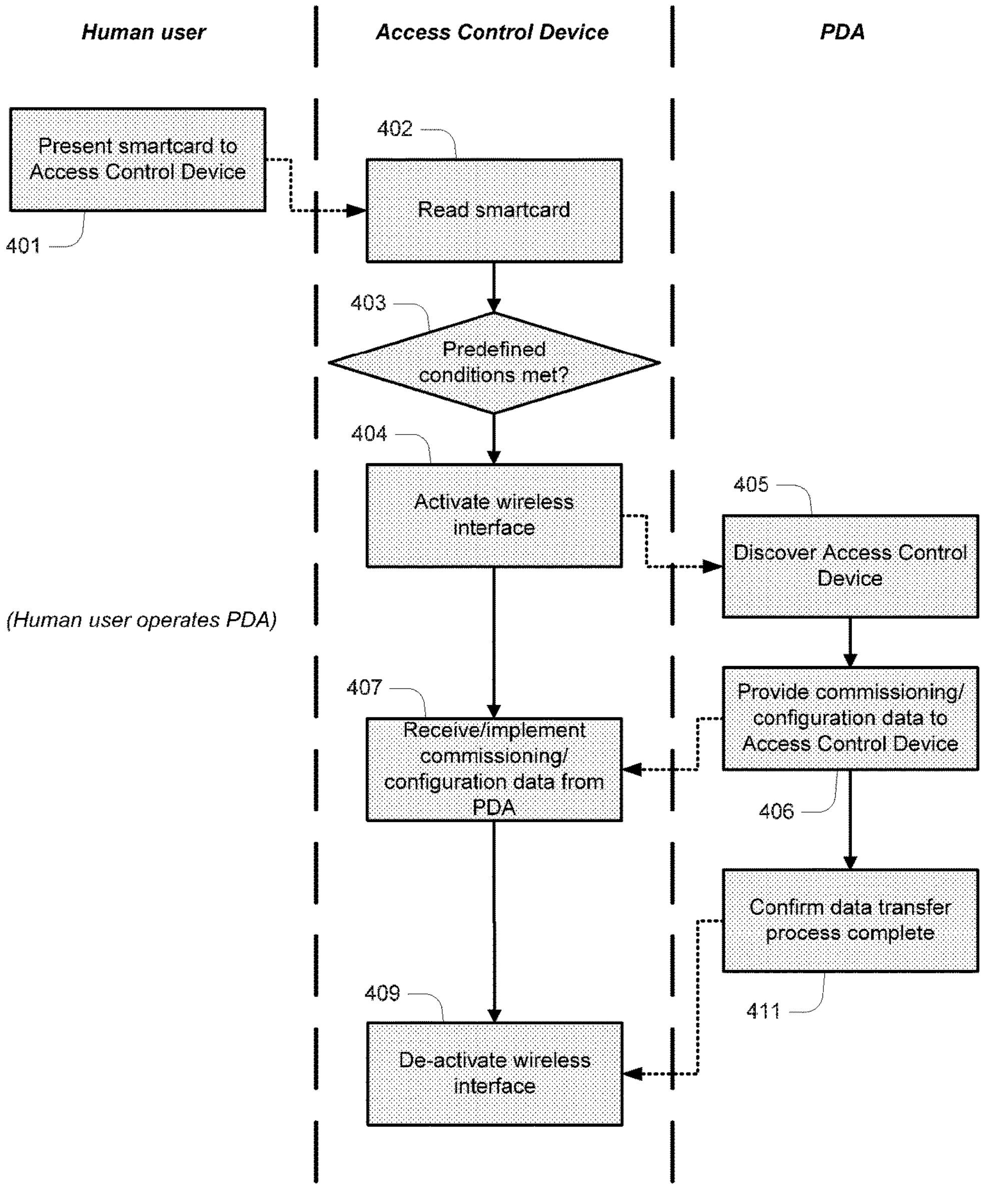
FIG. 4C schematically illustrates a method according to one embodiment.

Other embodiments adopt alternate approaches for disabling the wireless communications model. For example, in FIG. 4B step 410 includes a timeout event in the access control device (for example occurring after a predefined period without input from the PDA) and in FIG. 4C step 411 includes the provision of a command from the PDA to confirm that the data transfer process is complete, and that the wireless communications protocol can be disabled.

In terms of an initial site setup, the user repeats the above methods for all access control devices that are to be commissioned on site. The user then imports data from the PDA into a central location (such as administration server 110 of FIG. 1). Alternatively, if all of the access control devices are network-connected to the central location, a user can discover them from the over the network directly.

Because of the information fed by the user into each access control device via the PDA following physical identification, each access control device is easily distinguishable at the central location. A user can then assign access control device specific configuration data to each access control device. This data may include the likes of access levels, time periods, details of zone, cardholder certificates and so on. The data may also include firmware files, for example where a desire exists to update firmware on particular access control devices. As discussed below, the configuration data is subsequently provided to the relevant access control devices.

For connected access control devices, configuration data is readily uploaded from the central location over the existing network. For disconnected access control devices, the configuration data is exported to the PDA, and delivered generally as discussed in relation to FIG. 4A to FIG. 4C. That is, the user enables the wireless module of PDA, launches the commissioning application on the PDA, and goes to a concerned access control device. By presenting the special smartcard to the device, the user enables the wireless ad-hoc mode of the device, and the commissioning application on the PDA discovers and displays the device. In some embodiments, the commissioning application is responsive to data indicative of the discovered device for automatically detecting that there is configuration data available on the PDA for the discovered device (for example based on the identification information), and starts transferring that configuration data to the access control device (for example by way of Secure File Transfer over wireless). Once the transfer is complete, the status of transfer is written on the PDA. The user then provides data indicative of the transfer to the central location, such that the central location is informed of the configuration information loaded on the access control device. In some embodiments information regarding configured door connections is also uploaded to the PDA for propagation back to the central location.

For disconnected access control devices, which may be installed at locations far away from the central location, it might be problematic for require two physical trips by a user (firstly for the purpose of commissioning and secondly for provision of configuration data). To manage this concern, a user is able to create "logical access control devices", which essentially include configuration data for a hypothetical access control device (logical configuration data). These are created at the central location without knowledge of details such as a serial number, MAC address, and so on for a specific access control device. Configuration information for a logical access control device includes a standardized set of configuration data (optionally including firmware data). This is exported to the PDA. The user then, when commissioning a disconnected device in the manner discussed above, select a 'logical access control device' which provides appropriate configuration data for the physical access control device. This allows appropriate configuration data to be provided to the physical access control device wirelessly via the PDA. The logical device is then mapped to the physical device, such that the central location can be informed of the results of device configuration. That is, the logical device at the central location is updated based on information concerning the physical device to which the logical device was mapped.

Figure 5A:
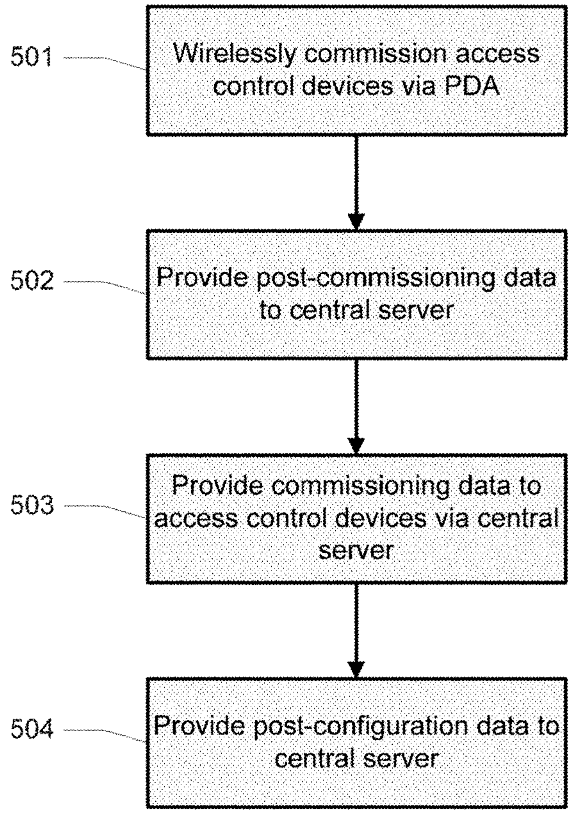
FIG. 5A schematically illustrates a method according to one embodiment.
Figure 5B:
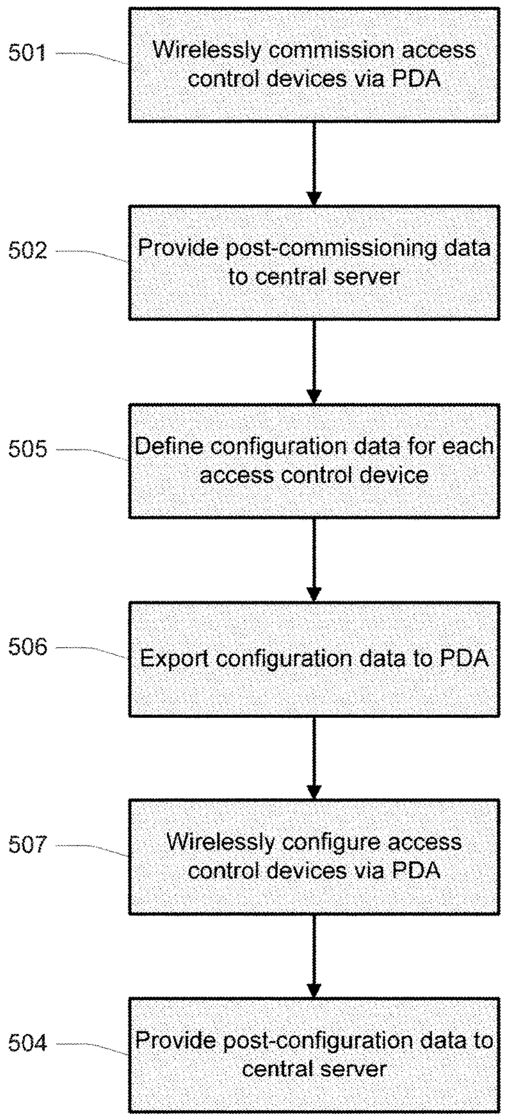
FIG. 5B schematically illustrates a method according to one embodiment.
Figure 5C:
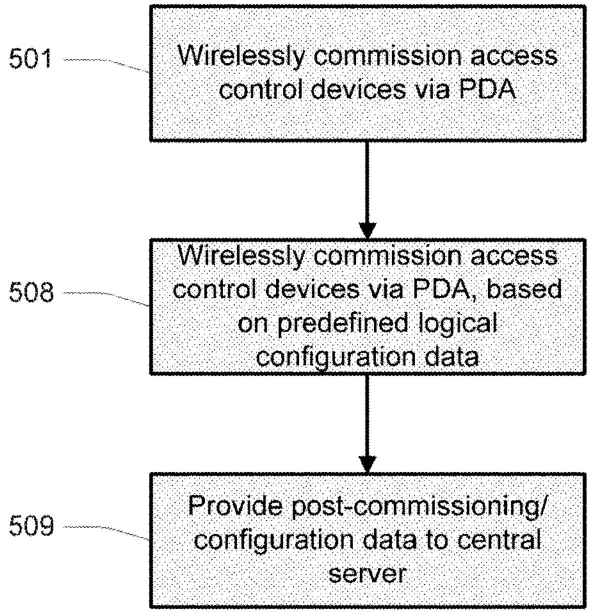
FIG. 5C schematically illustrates a method according to one embodiment.

By way of summary, FIG. 5A, FIG. 5B and FIG. 5C provide overviews of commissioning/configuration procedures according to embodiments of the present invention.

FIG. 5A describes a procedure for connected devices. A user wirelessly commissions access control devices at step 501 generally as discussed above. Post-commissioning data is provided to a central server at step 502. Then, at step 503, the central server delivers appropriate configuration data to the connected devices, and receives post-configuration data at step 504.

FIG. 5B describes a procedure for disconnected devices. A user wirelessly commissions access control devices at step 501 generally as discussed above. Post-commissioning data is provided to a central server at step 502. Step 505 includes defining configuration data for each access control device, and this is exported to the PDA at step 506. The devices are then wirelessly configured using the PDA at 507, and post-configuration data returned to the central server (via the PDA) at step 504.

FIG. 5C describes another procedure for disconnected devices. A user wirelessly commissions access control devices at step 501 generally as discussed above. Concurrently with, or following, the commissioning of an given device, the user wirelessly provides configuration data via the PDA, based on predefined logical configuration data maintained on the PDA. Post-commissioning and post configuration data is provided to the central server at step 509.

In some embodiments, a prioritizing protocol is implemented to manage conflicting configuration data between a PDA, central server, and/or access control device. For example, while providing identification information to an access control device and testing door connections, a user may enter some configuration information for door connections via the PDA. This configuration information can be uploaded to the central server either via a network discovery process (for connected devices) or via PDA back-propagation (for disconnected devices). There may be circumstances where configuration information provided to the reader via PDA conflicts with configuration information defined manually at the central server (or by other means). A prioritizing protocol is used to manage such conflicts. For example, algorithms may be implemented such that:

The configuration information defined at the central server is regarded as current, and preferentially applied.

The configuration information applied via PDA is regarded as current, and preferentially applied.

Configuration information is time stamped, and configuration information having the most recent time stamp is regarded as current (whether defined at the central server or applied via PDA), and preferentially applied.

Other algorithms are used in further embodiments. In some cases, different algorithms apply between categories of configuration information.

Such a prioritizing protocol may be implemented at a central server to deal with back-propagated conflicts (for example where current configuration information is back-propagated via PDA, and the back-propagated data differs from that already defined at the central server), or at a device (for example where configuration information accepted from the PDA should be preferentially applied over configuration information available from the central server via a device-server network connection).

It will be appreciated that the above disclosure provides various systems and methods for interacting with access control devices, these methods and systems providing distinct advantages and technical contributions over what was previously known in the art.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of various methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method for commissioning and/or configuring an access control device using a physical token and a separate portable computing device at a site of the access control device, the method including the access control device performing the steps of:

(a) receiving data indicative of a physical local interaction with the access control device, wherein the physical local interaction with the access control device is defined by the presentation of the physical token;

(b) responsive to the data received at (a), selectively enabling a wireless communications protocol of the access control device such that the access control device can temporarily communicate with the portable computing device;

(c) accepting commissioning and/or configuration information via the wireless communications protocol from the portable computing device; and (d) after accepting commissioning and/or configuration information from the portable computing device at (c), disabling the wireless communications protocol of the access control device such that the access control device can no longer communicate with the portable computing device.

2. A method according to claim 1 wherein the physical token is carried by a carrier substrate.

3. A method according to claim 2 wherein the carrier substrate is a smartcard.

4. A method according to claim 1 wherein the access control device is additionally configured to receive data indicative of a physical local interaction with the access control device and, in response, selectively grant access to a physical region or virtual functionality.

5. A method according to claim 1 wherein step (d) is performed responsive to a further physical local interaction with the device.

6. A method according to claim 1 wherein step (c) includes accepting commissioning information, and wherein configuration information is later accepted from a central server via a network.

7. A method according to claim 1 wherein step (c) includes accepting configuration information, and wherein a prioritizing protocol is implemented to determine whether configuration information accepted via the wireless communications protocol should be preferentially applied over configuration information available from a central server via a network.

8. An access control device including: an interface for allowing a physical local interaction with the access control device via an access card;

a processor that is responsive to the physical local interaction with the device for selectively enabling a wireless communications protocol of the access control device in order to allow the access control device to communicate with a portable computing device that is near the access control device;

a wireless communication module configured to accept commissioning and/or configuration information via the wireless communications protocol from the portable computing device; and the processor is responsive to predefined conditions for disabling the wireless communications protocol.

9. An access control device according to claim 8, wherein the access control device is additionally configured to receive data indicative of a physical local interaction with the device and, in response, selectively grant access to a physical region or virtual functionality.

10. An access control device according to claim 8, further including a network interface configured to communicate via a wide area network with an administration server, wherein the access control device is configured to operate connected to the wide area network.

11. An access control device according to claim 8, wherein the access control device is configured to operate without connection to a wide area network.

12. An access control device according to claim 11, wherein the access control device does not include a network interface other than the wireless communication module.

13. An access control device according to claim 8, wherein the wireless communication protocol is an ad-hoc protocol.

14. An access control device according to claim 8, wherein the access control device further comprises an access card reader for reading the access card.

15. An access control device according to claim 8, wherein the access card cannot communicate with the access control device using the wireless communications protocol.

16. A method for operating an access control device that controls access to a physical region using an access card and a separate portable computing device at a site of the access control device, the method comprising:

(a) reading data from an access card via an access card reader of the access control device;

(b) responsive to the data read at (a), selectively enabling a wireless communications protocol of the access control device such that the access control device can temporarily communicate with the portable computing device;

(c) accepting commissioning and/or configuration information from the portable computing device via a communications interface; and (d) after accepting commissioning and/or configuration information from the portable computing device at (c), disabling the wireless communications protocol of the access control device such that the access control device can no longer communicate with the portable computing device.

17. A method according to claim 16 wherein step (b) includes accepting commissioning information via the communications interface, and wherein configuration information is later accepted from a central server via a network.

18. The method of claim 16, wherein the access card is a smart card.

19. The method of claim 16, wherein the access card is not capable of communicating with the access control device via the same communications interface that accepts commissioning and/or configuration, information from the portable computing device.

* * * * *